S. W. Bidwell,
Boring and Mortising Wood,
Nº 32,509. Patented June 11, 1861.
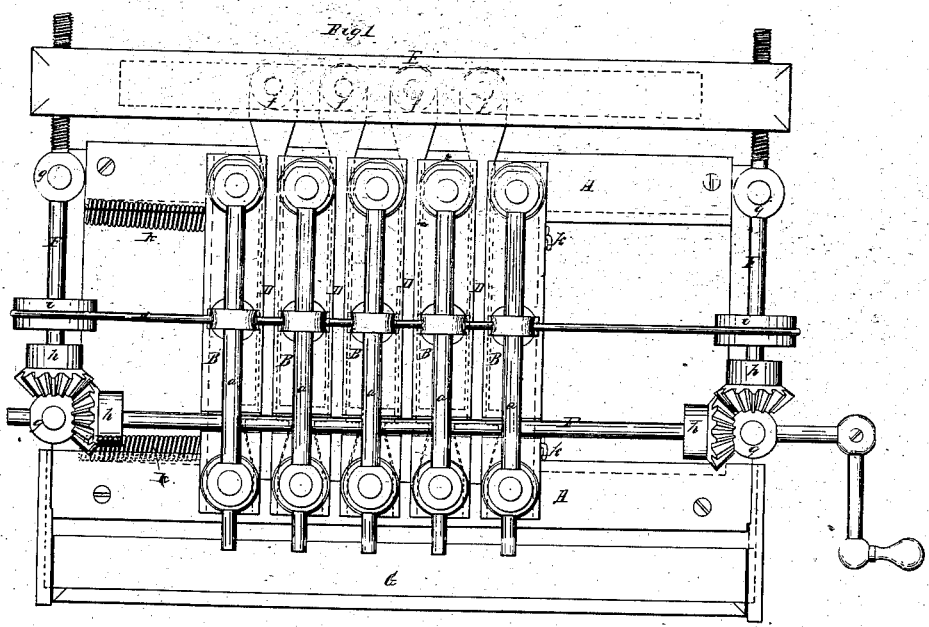
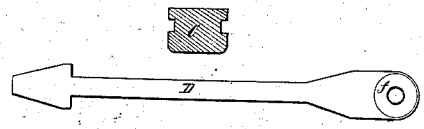
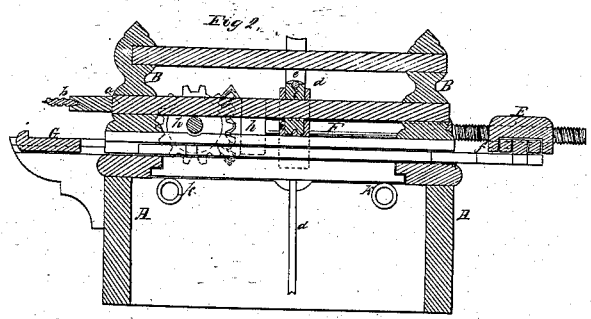
Witnesses.
Edward W Bliss
Jeremy W Bliss
Inventor.
Samuel W Bidwell

UNITED STATES PATENT OFFICE.

SAMUEL W. BIDWELL, OF HARTFORD, CONNECTICUT.

MACHINE FOR BORING AND MORTISING.

Specification of Letters Patent No. 32,509, dated June 11, 1861.

*To all whom it may concern:*

Be it known that I, SAMUEL W. BIDWELL, of Hartford, county of Hartford, and State of Connecticut, have invented a certain new and useful Improvement in Machines for Boring Wood; and I do hereby declare that the same is described and represented in the following specification and drawings; and to enable others skilled in the art to make and use my said improvement I will proceed to describe its construction and operation, referring to the drawings, in which the same letters indicate like parts in each of the figures.

The nature of this improvement consists in arranging any number of spindles in a line, upon a proper frame work, and in providing therefor a proper adjusting device so that in adjusting either two of said spindles (in which the bit is secured) at any required distance, from center to center, the whole number of spindles by the same operation, will be adjusted to even distances therewith; and it also consists in providing proper means of applying the driving belt, that the distances of the spindles from center to center may be increased or diminished, without changing the length of the belt.

The object desired to be accomplished by this improvement is to simplify, and at the same time produce a machine more rapid in its operation, and more quickly and easily changed, as desired, from time to time.

In the accompanying drawings Figure 1, is a top view of the machine Fig. 2, is a sectional end view.

A, is the frame work.

B, is the head stock, in which the spindle, that holds the bit is secured, as in the ordinary way.

C, is an end section of the bed of the head stock.

*a*, is the spindle.

*b* is the boring bit.

*c*, is a pulley secured upon the spindle *a*.

*d*, is the driving belt.

*e*, is a friction roll, to hold the belt closely upon the pulley *c*.

D, is an adjusting guide, or pattern, or it is a double wedged shape slat, on which a friction pulley *f*, is secured, and turns on a pivot, on one end of said guide or pattern. The pulley *f*, is fitted into a recess or groove, shown by dotted lines in the plate E.

E, is a movable plate having a recess or groove in one side to receive the friction roll secured on one end of the pattern D. In each end of said plate are formed nuts to receive screws, for the purpose of moving it (with the guide or pattern D) to or from the machine.

F, F, F′, are geared shafting, one of which (the shaft F′) shafts is secured lengthwise of the machine in studs, or boxes *g*. The other two are secured, one on one end of the machine, and the other on the other end of the machine in boxes or studs *g*, and receive their motion from the shaft F′, by means of proper gearing, such as *h*. On the outer ends of the shafts F are formed screws, which are fitted into nuts in the outer ends of the plate E.

In the sides of the base of the head stock B, are formed proper projections, or inclined planes, similar to and for the guide or pattern D, to work against.

G, is a carriage, on which the work is placed and held, to be moved up to the bits when the machine is ready for operation.

The headstock B′ is fastened to the frame work of the machine, while all the others are fitted to the frame work in a proper and movable manner to allow each one separately to move in a parallel line toward or from the one fixed to the frame work.

The driving belt *d* passes from the driving pulley over the pulley *i*, on one of the shafts F, and over the spindle pulley *c*, then back over the other pulley *i*, to the driving pulley again.

The several heads are kept closely together by a yielding pressure, such as a spring *k*, or weights, properly applied thereto for that purpose.

Now it will be seen that by turning the crank or shaft F′, the plate E, will be drawn inward, or moved outward by the action of the screws on the shafts F, at the same time the pattern D, is moved in the same direction, thereby causing the head stocks B, to move to or from each other in exact distances from center to center, that is to say, if the first two are set two inches from center to center, all the others will be the same distance, and if the first are again moved the others will move in the same proportion. Thus the machine may be quickly and easily set to bore any number of holes at even distances apart, as for blind slats &c. It will also be seen that however much they may be moved toward or from each other (the spindle) the length of the belt *d* remains unchanged, and it may be made more or less taut by the friction rolls *e*, which I propose sometimes to make adjustable, so as to give more or less pressure on the belt *d*.

I believe I have shown the construction and the operation of the machine so as to enable a person skilled to make and use the same.

What I claim therefore and desire to secure by Letters Patent is—

1. The guide or pattern D, in combination with the plate E, shafts F, and head stocks B, arranged and operating substantially as and for the purpose described.

2. The arrangement of the pulleys *i* belt *d* friction rolls *e*, with the sliding heads B, and pulleys *c*, substantially as and for the purpose described In testimony whereof I have hereunto set my hand and seal this 6th day of April 1861.

SAMUEL W. BIDWELL. [L. S.]

Witnesses:
  EDWARD W. BLISS,
  JEREMY W. BLISS.